(12) United States Patent
Lou

(10) Patent No.: US 11,971,157 B2
(45) Date of Patent: Apr. 30, 2024

(54) STEERING MECHANISM AND LIGHT HAVING SAME

(71) Applicant: Juanjuan Lou, Tianjin (CN)

(72) Inventor: Juanjuan Lou, Tianjin (CN)

( * ) Notice: Subject to any disclaimer, the term of this patent is extended or adjusted under 35 U.S.C. 154(b) by 0 days.

(21) Appl. No.: 18/229,193

(22) Filed: Aug. 2, 2023

(65) Prior Publication Data

US 2024/0011626 A1  Jan. 11, 2024

(30) Foreign Application Priority Data

Jun. 30, 2023  (CN) .......................... 202321699771.5

(51) Int. Cl.
| | |
|---|---|
| *F21V 21/28* | (2006.01) |
| *F16M 11/04* | (2006.01) |
| *F16M 11/20* | (2006.01) |
| *F21V 21/26* | (2006.01) |
| *F21V 21/29* | (2006.01) |
| *F21V 21/30* | (2006.01) |

(52) U.S. Cl.
CPC ............. *F21V 21/28* (2013.01); *F16M 11/045* (2013.01); *F16M 11/2014* (2013.01); *F21V 21/26* (2013.01); *F21V 21/29* (2013.01); *F21V 21/30* (2013.01)

(58) Field of Classification Search
CPC .......... F21V 21/26; F21V 21/28; F21V 21/29; F21V 21/30
See application file for complete search history.

(56) References Cited

U.S. PATENT DOCUMENTS

| | | | | |
|---|---|---|---|---|
| 695,022 | A * | 3/1902 | Albertson | ............... F21V 21/26 123/189 |
| 1,123,839 | A * | 1/1915 | Bridges | ................. F16K 15/026 184/105.3 |
| 2,255,262 | A * | 9/1941 | MacFadden | ............ F21V 21/30 285/907 |
| 5,275,444 | A * | 1/1994 | Wythoff | .............. F16L 27/0849 285/272 |
| 8,596,686 | B1 * | 12/2013 | Desai | ..................... E03C 1/0408 285/272 |
| 11,519,590 | B2 | 12/2022 | Mai | |
| 2009/0190356 | A1 * | 7/2009 | Kauffman | ............... F21V 25/04 362/365 |
| 2011/0182079 | A1 * | 7/2011 | Hsieh | ...................... F21S 6/002 362/427 |
| 2022/0221159 | A1 * | 7/2022 | Reischmann | ............. F21S 9/02 |

* cited by examiner

*Primary Examiner* — Colin J Cattanach

(57) ABSTRACT

A steering mechanism includes a first rotating column, a second rotating column, and a middle rotating shaft. The first rotating column has a first inclined surface. A second inclined surface matching the first inclined surface is disposed at one end of the second rotating column. One end of the middle rotating shaft is secured to a center of a circle of the first inclined surface, and the other end thereof penetrates through a center of a circle of the second inclined surface. The second inclined surface rotates around an axis of the middle rotating shaft. A luminaire including the steering mechanism can irradiate light at different angles.

1 Claim, 5 Drawing Sheets

STEERING MECHANISM AND LIGHT HAVING SAME

BACKGROUND OF THE INVENTION

1. Field of the Invention

The invention relates to lighting apparatuses and more particularly to a steering mechanism and a luminaire having same.

2. Description of Related Art

A lighting apparatus includes a luminaire. There are various styles of luminaires on the market, and the luminaires are used in a plurality of fields such as automobile maintenance, office space, road lighting, and the like. With the development of luminaire technologies and the improvement of social demands, requirements for the luminaire become increasingly high.

In a conventional art, to facilitate usage, a worker may mount the luminaire at different positions, to enable the luminaire can irradiate light at different angles.

In the foregoing conventional art, a plurality of luminaires need to be mounted. This raises costs of lighting.

Thus, the need for improvement still exists.

SUMMARY OF THE INVENTION

To enable a luminaire to irradiate light at different angles, the invention provides a steering mechanism and a luminaire thereof.

The steering mechanism provided in the invention adopts the following technical solutions:

A steering mechanism includes a first rotating column, a second rotating column, and a middle rotating shaft, wherein the first rotating column has a first inclined surface, a second inclined surface matching the first inclined surface is disposed at one end of the second rotating column, one end of the middle rotating shaft is secured to a center of a circle of the first inclined surface, the other end of the middle rotating shaft penetrates through a center of a circle of the second inclined surface, and the second inclined surface rotates around an axis of the middle rotating shaft.

According to the foregoing technical solutions, when an angle needs to be changed, a worker holds the second rotating column and rotates the second rotating column around the axis of the middle rotating shaft, and the second rotating column drives the second inclined surface to rotate around the axis of the middle rotating shaft. This enables the second inclined surface to rotate relative to the first inclined surface, and then changes an angle of one end, opposite to the second inclined surface, of the second rotating column. When an illuminating angle of light of a luminaire needs to be changed, the worker mounts a luminaire that irradiate light on the one end, opposite to the second inclined surface, of the second rotating column. When the angle of one end, opposite to the second inclined surface, of the second rotating column is changed, the illuminating angle of the luminaire is changed. Therefore, the worker does not need to additionally mount the luminaire at positions at various angels. This reduces costs of lighting.

Preferably, an included angle between the first inclined surface and an axis of the first rotating column is 45°, and an included angle between the second inclined surface and an axis of the second rotating column is 45°.

Preferably, the middle rotating shaft is a bolt, the middle rotating shaft is connected to the center of a circle of the first inclined surface in a threaded manner, and the middle rotating shaft penetrates through the center of a circle of the second inclined surface.

Preferably, a perforation is opened at a position on a second rotating column, one end of the perforation is connected to the center of a circle of the second inclined surface, the other end of the perforation is connected to an outer part of the second rotating column, and one end, opposite to the first rotating column, of the middle rotating shaft is inserted into the perforation, and abuts against a wall of the perforation.

Preferably, a guide block is disposed on the first inclined surface, a guide groove is circumferentially disposed on the second inclined surface, the guide block is slidably matched with the guide groove, and a circumferential direction of the guide groove is the same as a rotating direction of the second rotating column.

Preferably, a positioning assembly and an accommodating groove are disposed on the first inclined surface, the positioning assembly is accommodated in the accommodating groove, the positioning assembly comprises a positioning block and a spring, the spring is secured to one end of the positioning block and at a bottom of the accommodating groove, a positioning hole is opened on the second inclined surface, the positioning hole is inserted into and matched with the positioning block, and when the spring is in a natural state, the positioning block is inserted in and matched with the positioning hole.

Preferably, there are two groups of positioning assemblies, and the two groups of positioning assemblies are respectively located at two opposite ends of the first inclined surface in a length direction.

Preferably, one end, opposite to the spring, of the positioning block is in a hemispherical shape.

Preferably, an abutting ring is further disposed between the first inclined surface and the second inclined surface, and the abutting ring separately abuts between the first inclined surface and second inclined surface.

The invention further provides a lighting apparatus, and adopts the following technical solutions.

A lighting apparatus includes a bracket, a luminaire, and the foregoing steering mechanism. The bracket is mounted on the first rotating column in a detachable manner, and the luminaire is mounted on the second rotating column in a detachable manner.

In conclusion, the invention has the following beneficial effects:

The worker holds the second rotating column and rotates the second rotating column around the axis of the middle rotating shaft, and the second rotating column drives the second inclined surface to rotate around the axis of the middle rotating shaft. This enables the second inclined surface to rotate relative to the first inclined surface, and then changes an angle of one end, opposite to the second inclined surface, of the second rotating column. When an illuminating angle of light of a luminaire needs to be changed, the worker mounts a luminaire that irradiate light on the one end, opposite to the second inclined surface, of the second rotating column. When the angle of one end, opposite to the second inclined surface, of the second rotating column is changed, the illuminating angle of the luminaire is changed. Therefore, the worker does not need to additionally mount the luminaire at positions at various angels. This reduces costs of lighting.

By using the included angle between the first inclined surface and the axis of the first rotating column and the included angle between the second inclined surface and the axis of the second rotating column, the axis of the second rotating column may be perpendicular to the axis of the first rotating column, to enable the illuminating angle of light of the luminaire to rotate by exactly 90°.

A threaded end of the middle rotating shaft penetrates through the perforation and is connected to the first rotating column in the threaded manner, the other end of the middle rotating shaft is inserted in the perforation, and the end of the middle rotating shaft abuts against the wall of the perforation. Therefore, the second rotating column from falling off during rotation. This improves stability of a connection between the second rotating column and the first rotating column.

The above and other objects, features and advantages of the invention will become apparent from the following detailed description taken with the accompanying drawings.

DETAILED DESCRIPTION OF THE INVENTION

Figure 1:
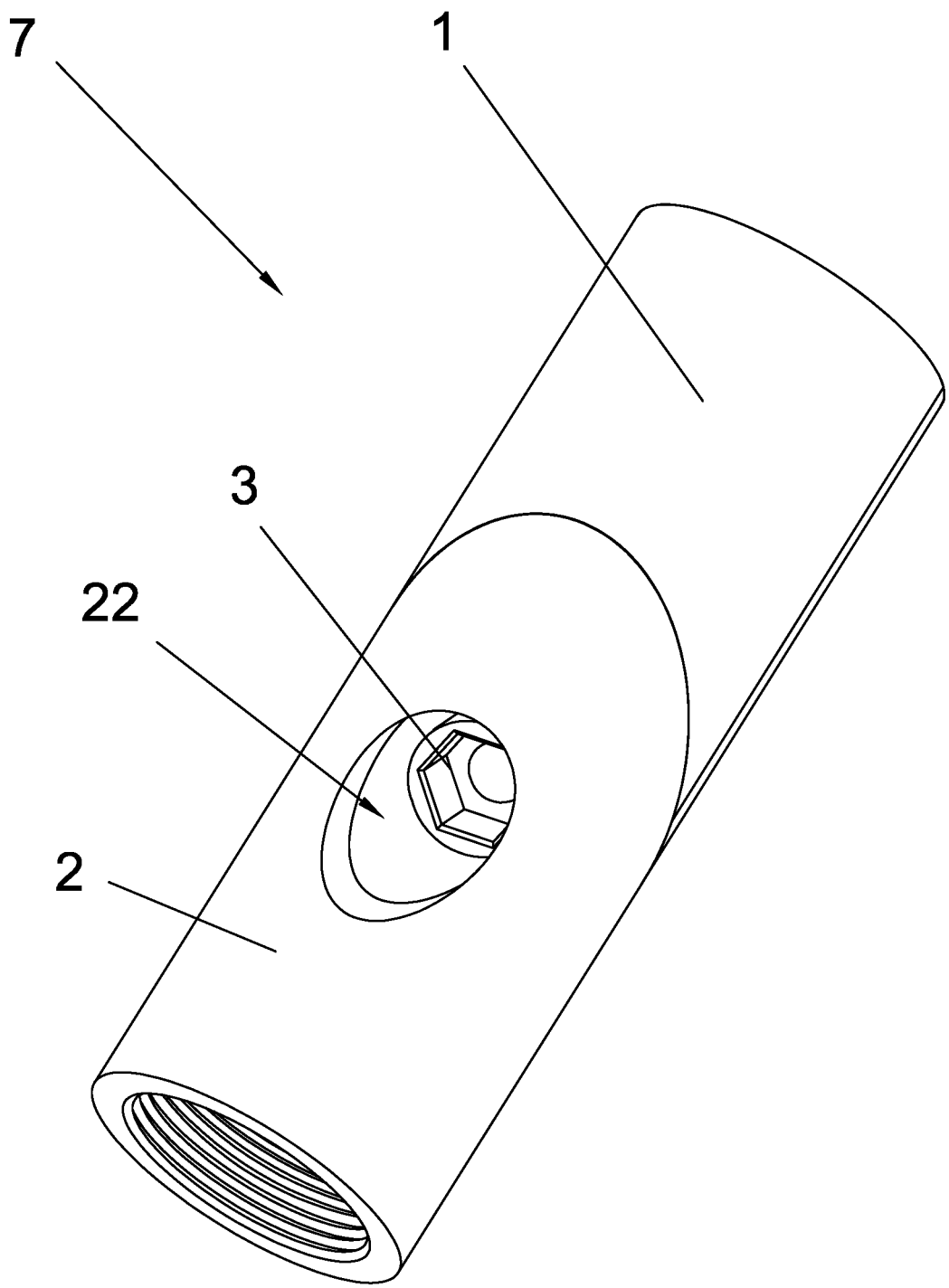
FIG. 1 is a perspective view of a steering mechanism according to a preferred embodiment of the invention.
Figure 2:
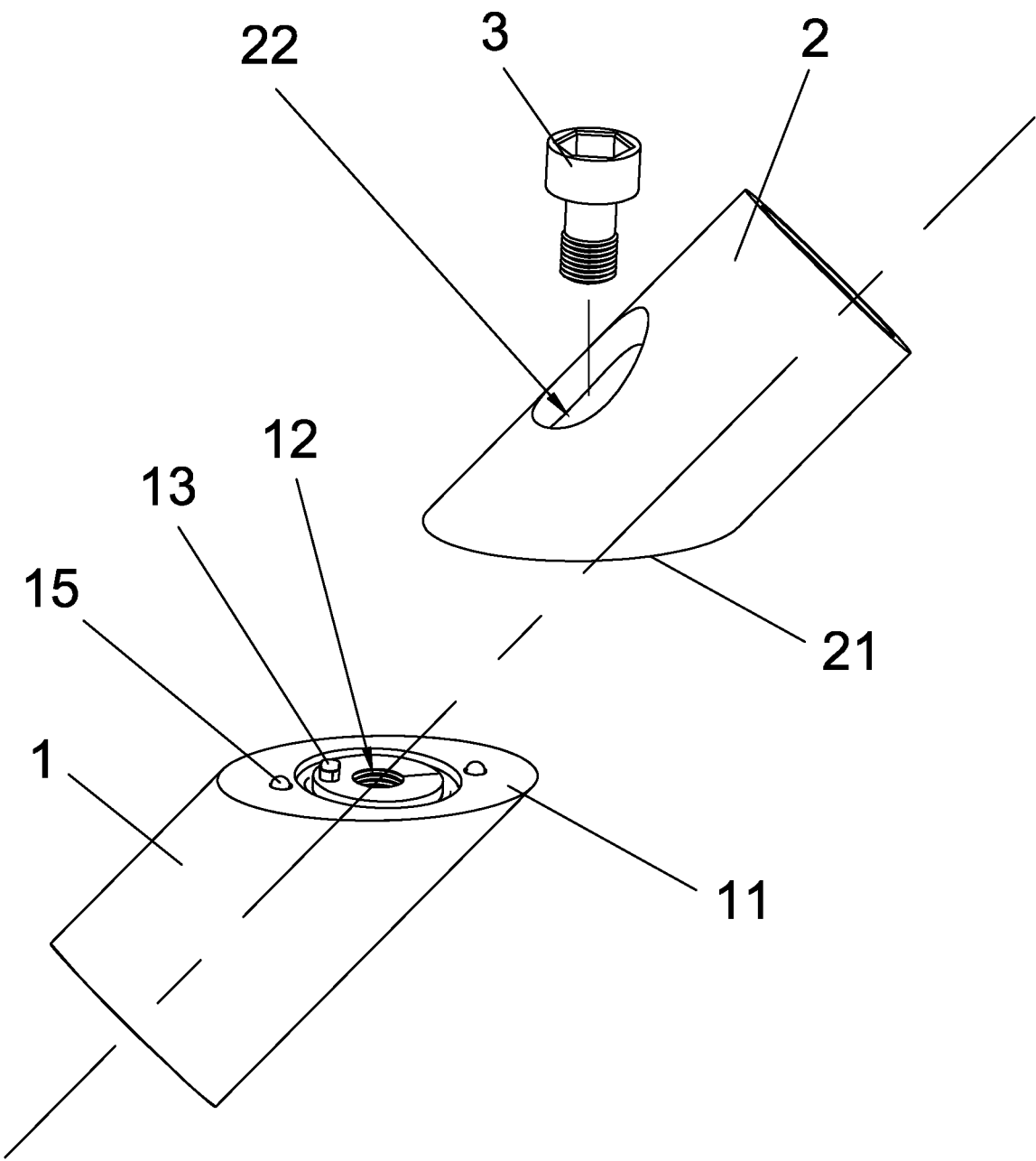
FIG. 2 is an exploded view of the steering mechanism.
Figure 3:
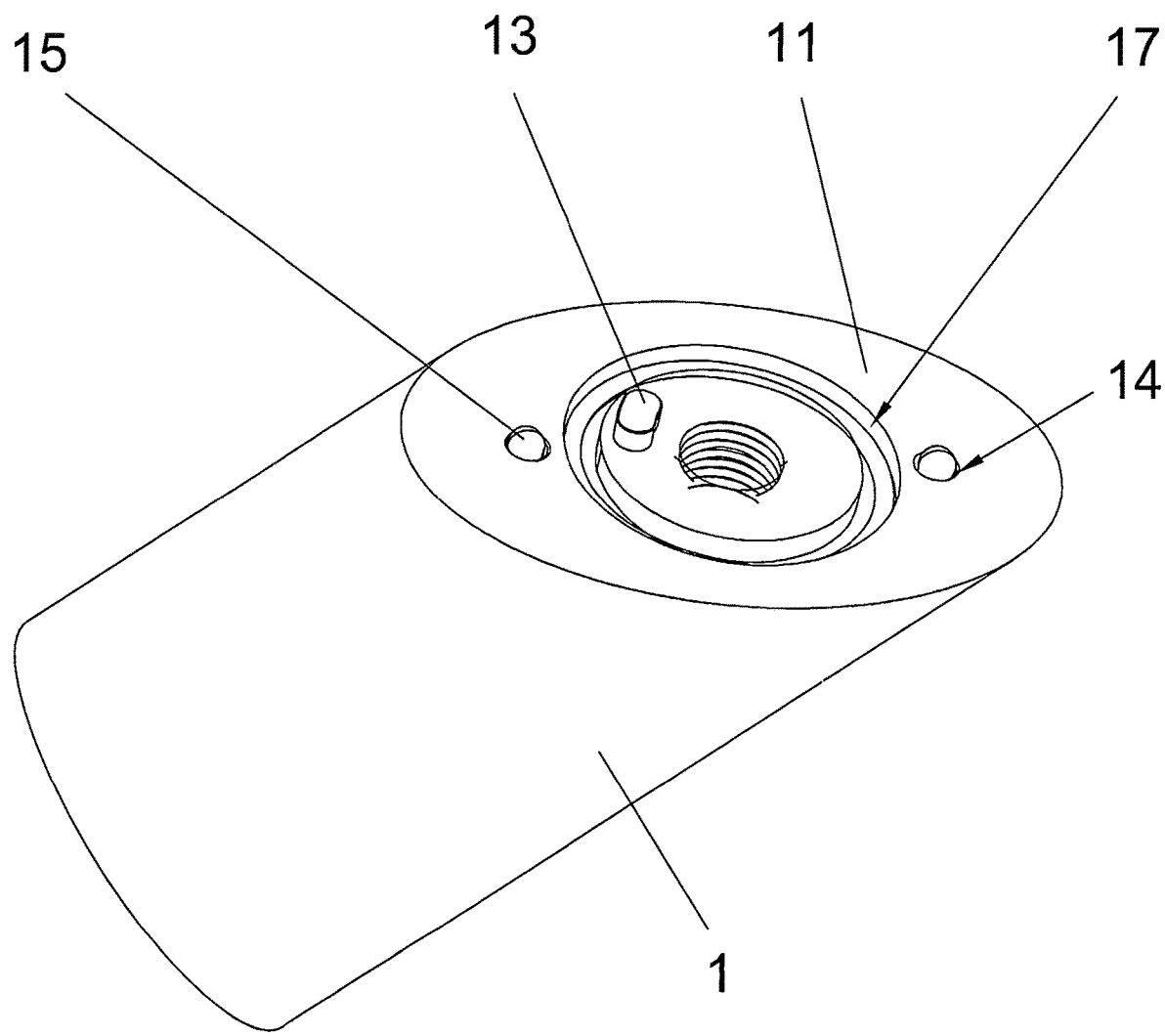
FIG. 3 is an enlarged view of the first rotating column in FIG. 2.
Figure 4:
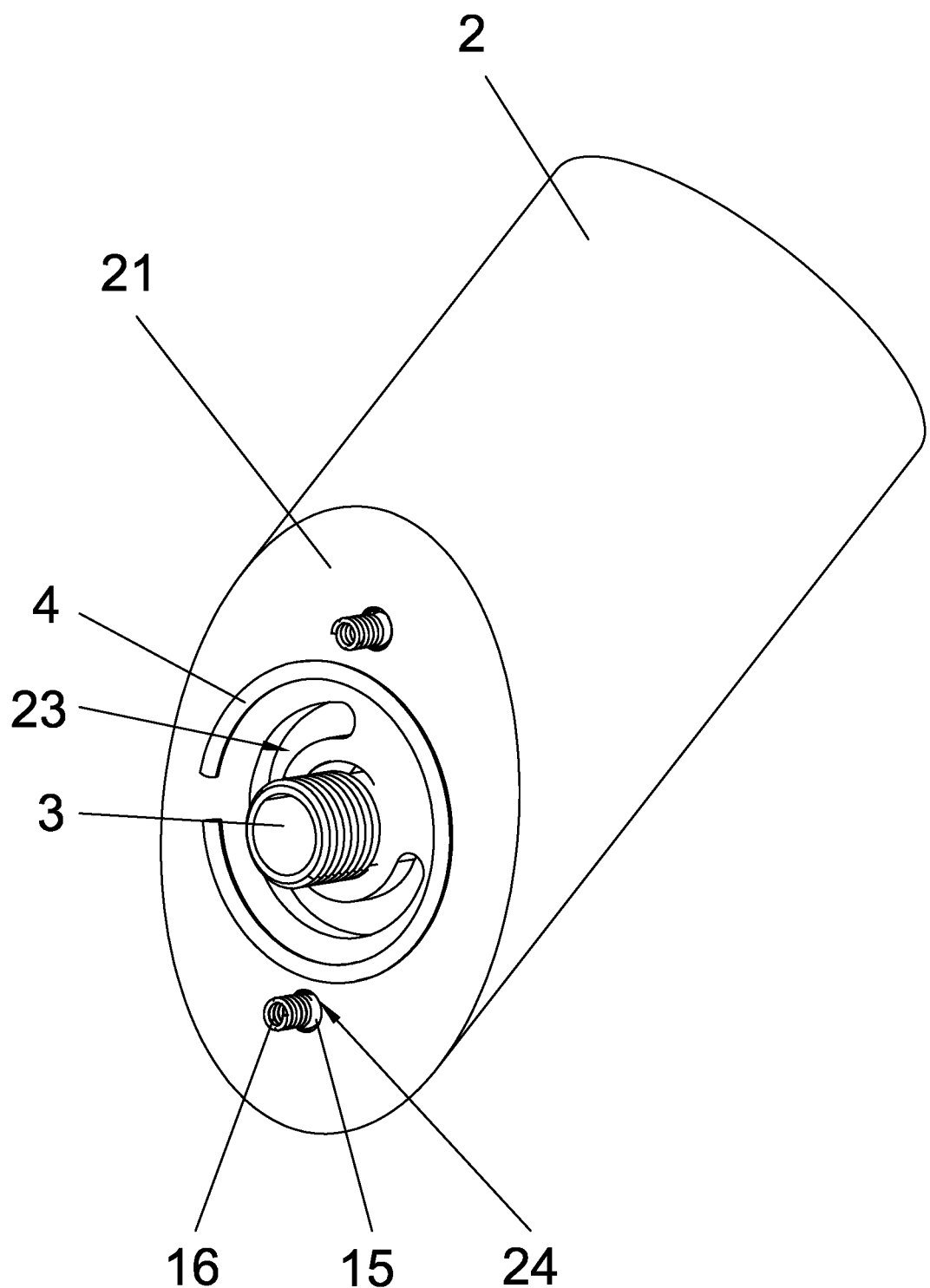
FIG. 4 is an enlarged view of the second rotating column in FIG. 2.

Referring to FIGS. 1 to 4, a steering mechanism 7 according to a preferred embodiment of the invention comprises a first rotating column 1, a second rotating column 2, and a middle rotating shaft 3. The first rotating column 1 has a first inclined surface 11, and a second inclined surface 21 matching the first inclined surface 11 is disposed at one end of the second rotating column 2. Preferably, in this embodiment of the invention, because the first rotating column 1 and the second rotating column 2 each is in a cylindrical shape, the first inclined surface 11 and the second inclined surface 21 each is in an elliptical shape.

One end of the middle rotating shaft 3 is secured to a center of a circle of the first inclined surface 11, and the other end of the middle rotating shaft 3 penetrates through a center of a circle of the second inclined surface 21. The second inclined surface 21 rotates around an axis of the middle rotating shaft 3. Preferably, in this embodiment of the invention, the middle rotating shaft 3 is a bolt. A threaded hole 12 is opened at the center of a circle of the first inclined surface 11, and a perforation 22 is opened at the center of a circle of the second rotating column 2. An axis of the perforation 22 coincides with an axis of the threaded hole 12. One end of the perforation 22 is connected to the center of a circle of the second inclined surface 21, and the other end of the perforation 22 is connected to an outer part of the second rotating column 2. A wall of the perforation 22 abuts against one end, opposite to a threaded end, of the bolt.

When the second rotating column 2 needs to be mounted on the first rotating column 1, the bolt penetrates through the perforation 22 by a worker and is connected to the threaded hole 12 in a threaded manner, until that the one end, opposite to a threaded end, of the bolt abuts against the wall of the perforation 22, to connect the first rotating column 1 to the second rotating column 2.

When the second rotating column 2 needs to be rotated, the second rotating column 2 rotates around the axis of the bolt, to prevent, by using the bolt, the second rotating column 2 from falling off during rotation. This improves stability of a connection between the second rotating column 2 and the first rotating column 1.

Preferably, in this embodiment of the invention, an included angle between the first inclined surface 11 and an axis of the first rotating column 1 is 45°, and an included angle between the second inclined surface 21 and an axis of the second rotating column 2 is 45°.

When the second rotating column 2 rotates by 180°, by using the included angle between the first inclined surface 11 and the axis of the first rotating column 1 and the included angle between the second inclined surface 21 and the axis of the second rotating column 2, the axis of the second rotating column 2 may be perpendicular to the axis of the first rotating column 1, to enable an illuminating angle of light of the lighting apparatus to rotate by exactly 90°.

Specifically, a guide block 13 is disposed on the first inclined surface 11, a guide groove 23 is circumferentially disposed on the second inclined surface 21, the guide block 13 is slidably matched with the guide groove 23, and a circumferential direction of the guide groove 23 is the same as a rotating direction of the second rotating column 2. Preferably, in this embodiment of the invention, the guide block 13 is curved in an arc shape, and a bending angle of the guide block 13 is matched with the guide groove 23. This improves sliding efficiency of the guide block 13 within the guide groove 23.

When the second rotating column 2 rotates, the second rotating column 2 drives the guide groove 23 to rotate, to enable the guide groove 23 to slip relative to the guide block 13. Because the guide block 13 is slidably matched with the guide groove 23, the second rotating column 2 does not offset while rotating. This improves rotating efficiency of the second rotating column 2.

As shown in FIG. 1 to FIG. 4 specifically, a positioning assembly and an accommodating groove 14 are disposed on the first inclined surface 11, and the positioning assembly is accommodated in the accommodating groove 14. The positioning assembly comprises a positioning block 15 and a spring 16, and the spring 16 is secured to one end of the positioning block 15 and at a bottom of the accommodating groove 14. A positioning hole 24 is opened on the second inclined surface 21, the positioning hole 24 is connected to the accommodating groove 14, and the positioning hole 24 is inserted into and matched with the positioning block 15. When the spring 16 is in a natural state, the positioning block 15 is inserted in and matched with the positioning hole 24.

One end, opposite to the spring 16, of the positioning block 15 is in a hemispherical shape.

When the second inclined surface 21 rotates, the second inclined surface 21 squeezes the positioning block 15, and one end of the positioning block 15 abuts against the second inclined surface 21. Because the one end of the positioning block is in the hemispherical shape, the positioning block 15 may automatically move toward an inner part of the accommodating groove 14. The positioning block 15 squeezes the spring 16 in a direction of the inner part of the accommodating groove 14, to enable the spring 16 to be in a compressed state, until the second inclined surface 21 is at a specific angle. Because the positioning hole 24 is connected to the accommodating groove 14, the spring 16 may be restored to a natural state and may push the positioning block 15, to enable the positioning block 15 is inserted in and matched with the positioning hole 24. Therefore, the second rotating column 2 is at a fixed angle and kept in a stable state. This improves stability of illumination of the lighting apparatus.

Preferably, in this embodiment of the invention, there are two groups of positioning assemblies, and the two groups of positioning assemblies are respectively located at two opposite ends of the first inclined surface 11 in a length direction. A quantity of positioning holes 24 is equal to a quantity of positioning assemblies, and positions of the positioning holes 24 correspond to positions of the positioning assemblies. Due to the two groups of positioning assemblies, stability of the second rotating column 2 after rotation is improved.

Specifically, an abutting ring 4 is further disposed between the first inclined surface 11 and the second inclined surface 21, and the abutting ring 4 is separately abuts between the first inclined surface 11 and second inclined surface 21. A slot 17 for accommodating the abutting ring 4 is circumferentially disposed on the first inclined surface 11. One side of the abutting ring 4 is inserted in and abuts against a bottom of the slot 17, and the other side of the abutting ring 4 abuts against the second inclined surface 21. By using the slot 17, the abutting ring 4 does not fall off when the second inclined surface 21 rotates.

Preferably, in the embodiment of the present application, the abutting ring 4 is a manganese steel ring.

When the first inclined surface 11 and the second inclined surface 21 rotate relative to each other, due to the abutting ring 4, friction in a large area between the first inclined surface 11 and the second inclined surface 21 is not increased. This reduces friction between the first inclined surface 11 and the second inclined surface 21, and improves the rotating efficiency of the second rotating column 2.

Figure 5:
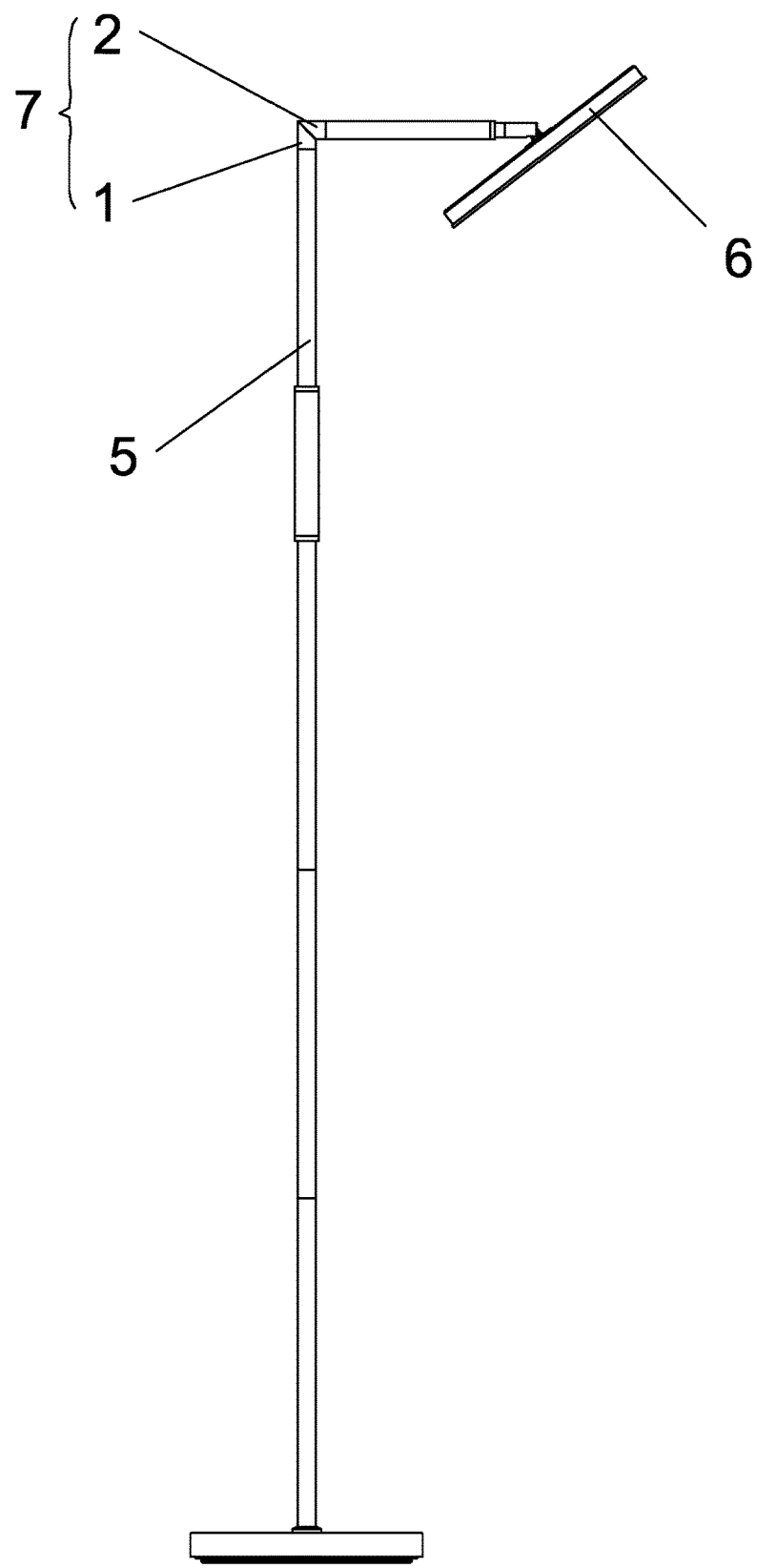
FIG. 5 is a perspective view of a lighting apparatus incorporating the steering mechanism according to the invention.

Refer to FIG. 5 in conjunction with FIGS. 1 to 4, a lighting apparatus according to the invention comprises a bracket 5, a luminaire 6, and the steering mechanism 7. The bracket 5 is mounted on the first rotating column 1 in a detachable manner, and the luminaire 6 is mounted on the second rotating column 2 in a detachable manner.

Preferably, in the invention, the bracket 5 is mounted on the first rotating column 1 through a bolt, and the luminaire 6 is mounted on the second rotating column 2 through a bolt.

When an illuminating angle of the luminaire 6 needs to be changed, a worker can directly rotate the second rotating column 2, and the second rotating column 2 drives the luminaire 6 to rotate, to change an illuminating angle of light of the luminaire 6.

While the invention has been described in terms of preferred embodiments, those skilled in the art will recognize that the invention can be practiced with modifications within the spirit and scope of the appended claims.

What is claimed is:

1. A swiveling mechanism, comprising:
   a first part including a first inclined surface disposed at a first end, a circular slot disposed in the first inclined surface, a threaded hole disposed in the first inclined surface and surrounded by the circular slot, a guide block disposed on the first inclined surface and between the circular slot and the threaded hole, two opposite accommodating holes disposed in the first inclined surface with the circular slot disposed therebetween, and two first positioning blocks projecting out of the opposite accommodating holes respectively;
   a second part including a second inclined surface disposed at a first end, the second inclined surface complementarily engaged with the first inclined surface, a perforation extending from an outer surface of the second part to the second inclined surface, an arc-shaped guide groove disposed in the second inclined surface and partially surrounding an inner end of the threaded hole, and an arc-shaped abutting projection disposed on the second inclined surface and partially surrounding the arc-shaped guide groove, two opposite positioning holes disposed in the second inclined surface with the arc-shaped abutting projection disposed therebetween, two second positioning blocks projecting out of the opposite positioning holes respectively, and two biasing members disposed on the second positioning blocks respectively; and
   a bolt passing through the perforation and having an end threadedly fastened in the threaded hole,
   wherein the guide block is slidably disposed in the arc-shaped guide groove;
   wherein the arc-shaped abutting projection is slidably disposed in the circular slot;
   wherein the biasing members urge against the first positioning blocks respectively and biased between the first inclined surface and the second inclined surface; and
   wherein the second part is configured to pivot on the bolt.

\* \* \* \* \*